United States Patent
Jia et al.

(10) Patent No.: US 11,029,565 B2
(45) Date of Patent: Jun. 8, 2021

(54) DISPLAY PANEL, DISPLAY DEVICE, AND METHOD FOR MANUFACTURING DISPLAY PANEL

(71) Applicant: BOE TECHNOLOGY GROUP CO., LTD., Beijing (CN)

(72) Inventors: Qian Jia, Beijing (CN); Jaegeon You, Beijing (CN); Xinxing Wang, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,503

(22) PCT Filed: May 23, 2019

(86) PCT No.: PCT/CN2019/088041
§ 371 (c)(1),
(2) Date: Feb. 27, 2020

(87) PCT Pub. No.: WO2019/223739
PCT Pub. Date: Nov. 28, 2019

(65) Prior Publication Data
US 2020/0183212 A1  Jun. 11, 2020

(30) Foreign Application Priority Data
May 24, 2018  (CN) .......... 201810506647.X

(51) Int. Cl.
*G02F 1/13363* (2006.01)
*G02F 1/1337* (2006.01)

(52) U.S. Cl.
CPC .... *G02F 1/13363* (2013.01); *G02F 1/133707* (2013.01); *G02F 1/133784* (2013.01); *G02F 2201/123* (2013.01); *G02F 2413/02* (2013.01)

(58) Field of Classification Search
CPC .......... G02F 1/13363; G02F 1/133784; G02F 1/133707; G02F 2201/123; G02F 2413/02; G02F 1/133749
See application file for complete search history.

(56) References Cited

U.S. PATENT DOCUMENTS 4,171,874 A * 10/1979 Bigelow .......... G02F 1/133605
349/67
8,025,936 B2 * 9/2011 Matsubara .......... G02B 5/3083
428/1.1

(Continued)

FOREIGN PATENT DOCUMENTS

CN  1740853 A  3/2006
CN  1758108 A  4/2006

(Continued)

OTHER PUBLICATIONS

First Office Action with English language counterpart, CN Application No. 201810506647.X, dated Apr. 14, 2020, 12 pp.

*Primary Examiner* — Hoan C Nguyen
(74) *Attorney, Agent, or Firm* — Myers Bigel, P.A.

(57) ABSTRACT

A display panel, a display device, and a method for manufacturing a display panel are provided. The display panel includes first and second substrates, first and second alignment films and a liquid crystal layer extending along a first direction and a second direction and sequentially along a third direction perpendicular to the first direction and the second direction. The liquid crystal layer includes a column of liquid crystal molecules along the third direction, and includes a first liquid crystal molecule closest to the first alignment film and a second liquid crystal molecule closest to the second alignment film. The first liquid crystal molecule and the second liquid crystal molecule have different (Continued)

tilting tendencies with respect to the plane defined by the first direction and the second direction, and form a twist angle.

18 Claims, 6 Drawing Sheets

(56) References Cited

U.S. PATENT DOCUMENTS

| | | | | |
|---|---|---|---|---|
| 8,416,376 | B2* | 4/2013 | Palto | G02F 1/134363 349/117 |
| 2002/0060765 | A1* | 5/2002 | Hattori | G02F 1/1395 349/134 |
| 2003/0193637 | A1* | 10/2003 | Mi | G02F 1/1395 349/123 |
| 2006/0072056 | A1 | 4/2006 | Nagai et al. | |
| 2008/0079878 | A1 | 4/2008 | Sugiyama et al. | |
| 2008/0158483 | A1* | 7/2008 | Saitoh | G02F 1/13363 349/96 |
| 2010/0026948 | A1 | 2/2010 | Wang et al. | |
| 2012/0038870 | A1* | 2/2012 | Kisara | G02F 1/1395 349/119 |
| 2014/0098313 | A1* | 4/2014 | Jang | H01L 33/0041 349/42 |
| 2014/0104557 | A1* | 4/2014 | Suzuki | G02F 1/134363 349/143 |
| 2015/0160492 | A1* | 6/2015 | Li | G02F 1/13471 349/33 |
| 2020/0183212 | A1 | 6/2020 | Jia et al. | |

FOREIGN PATENT DOCUMENTS

| | | |
|---|---|---|
| CN | 101153985 A | 4/2008 |
| CN | 105785657 A | 7/2016 |
| CN | 106707636 A | 5/2017 |
| CN | 108761925 A | 11/2018 |
| JP | 2009-3194 A | 1/2009 |

* cited by examiner

DISPLAY PANEL, DISPLAY DEVICE, AND METHOD FOR MANUFACTURING DISPLAY PANEL

RELATED APPLICATIONS

The present application is a 35 U.S.C. 371 national stage application of PCT International Application No. PCT/CN2019/088041, filed on May 23, 2019, which claims the benefit of Chinese Patent Application No. 201810506647.X, filed on May 24, 2018, the content contents of which are incorporated herein by reference in their entireties.

TECHNICAL FIELD

The present disclosure relates to the field of display technologies, and particularly to a display panel, a display device, and a method for manufacturing a display panel.

BACKGROUND

Common liquid crystal display panels may appear color shift under various viewing angles, which affects the display effect.

SUMMARY

According to an aspect of the present disclosure, there is provided a display panel, comprising a first substrate, a first alignment film, a liquid crystal layer, a second alignment film and a second substrate extending along a first direction and a second direction and sequentially arranged along a third direction perpendicular to the first direction and the second direction. The liquid crystal layer comprises a column of liquid crystal molecules arranged along the third direction, and the column of liquid crystal molecules comprises a first liquid crystal molecule closest to the first alignment film and a second liquid crystal molecule closest to the second alignment film. On a plane defined by the first direction and the second direction, an orthographic projection of a long axis of the first liquid crystal molecule is arranged at an acute angle to an orthographic projection of a long axis of the second liquid crystal molecule. On a plane defined by an angular bisector of the acute angle and the third direction, an extension line of the orthographic projection of the long axis of the first liquid crystal molecule intersects with an extension line of the orthographic projection of the long axis of the second liquid crystal molecule to form an intersection point. On a line where the third direction is located, an orthographic projection of the intersection point is between the orthographic projection of the long axis of the first liquid crystal molecule and the orthographic projection of the long axis of the second liquid crystal molecule.

In some embodiments, a sum of following items is 00: a degree of an angle formed by a line where the long axis of the first liquid crystal molecule is located and the plane defined by the first direction and the second direction; and a degree of the acute angle.

In some embodiments, an absolute value of the degree of the acute angle is less than or equal to 1.2°.

In some embodiments, an absolute value of the degree of the angle formed by the line where the long axis of the first liquid crystal molecule is located and the plane defined by the first direction and the second direction is less than or equal to 2°.

In some embodiments, the display panel further comprises at least one of a first compensation film at a side of the first substrate away from the liquid crystal layer and a second compensation film at a side of the second substrate away from the liquid crystal layer.

In some embodiments, the first compensation film is a +A uniaxial compensation film or a −A uniaxial compensation film, and the second compensation film is a +A uniaxial compensation film or a −A uniaxial compensation film.

In some embodiments, the column of liquid crystal molecules comprises a third liquid crystal molecule closest to a liquid crystal molecule of the +A uniaxial compensation film, and a direction of a long axis of the liquid crystal molecule of the +A uniaxial compensation film is perpendicular to a direction of a long axis of the third liquid crystal molecule.

In some embodiments, the column of liquid crystal molecules comprises a fourth liquid crystal molecule closest to a liquid crystal molecule of the −A uniaxial compensation film, and a direction of a long axis of the liquid crystal molecule of the −A uniaxial compensation film is the same as a direction of a long axis of the fourth liquid crystal molecule.

In some embodiments, the first compensation film and the second compensation film are both +A uniaxial compensation films, or the first compensation film and the second compensation film are both −A uniaxial compensation films.

In some embodiments, the first compensation film and the second compensation film have equal in-plane phase retardations for incident light with a same wavelength.

In some embodiments, the first compensation film and the second compensation film are both −A uniaxial compensation films, and ranges of the in-plane phase retardations of the first compensation film and the second compensation film for incident light with a wavelength of 550 nm are −65 nm to −70 nm.

In some embodiments, the first compensation film and the second compensation film are both +A uniaxial compensation films, and ranges of the in-plane phase retardations of the first compensation film and the second compensation film for incident light with a wavelength of 550 nm are 25 nm to 35 nm.

In some embodiments, the display panel is an ADS mode liquid crystal display panel.

In some embodiments, the display panel comprises a rectangular pixel, wherein an extending direction of a slit pixel electrode of the rectangular pixel is the same as an extending direction of a long side of the rectangular pixel.

According to another aspect of the present disclosure, there is provided a display device, comprising the display panel according to any one of the embodiments of the present disclosure.

According to yet another aspect of the present disclosure, there is provided a method for manufacturing a display panel, comprising: providing a first substrate and a second substrate extending along a first direction and a second direction; forming a first alignment material film on the first substrate and forming a second alignment material film on the second substrate; rubbing the first alignment material film and the second alignment material film along a same direction, so that the first alignment material film becomes a first alignment film and the second alignment material film becomes a second alignment film; providing liquid crystal on the first alignment film or the second alignment film; and bonding the first substrate and the second substrate, so that the first substrate, the first alignment film, a liquid crystal layer formed by the liquid crystal, the second alignment film and the second substrate are sequentially arranged along a third direction perpendicular to the first direction and the second direction. The liquid crystal layer comprises a column of liquid crystal molecules arranged along the third direction, and the column of liquid crystal molecules comprises a first liquid crystal molecule closest to the first alignment film and a second liquid crystal molecule closest to the second alignment film. On a plane defined by the first direction and the second direction, an orthographic projection of a long axis of the first liquid crystal molecule is arranged at an acute angle to an orthographic projection of a long axis of the second liquid crystal molecule. On a plane defined by an angular bisector of the acute angle and the third direction, an extension line of the orthographic projection of the long axis of the first liquid crystal molecule intersects with an extension line of the orthographic projection of the long axis of the second liquid crystal molecule to form an intersection point. On a line where the third direction is located, an orthographic projection of the intersection point is between the orthographic projection of the long axis of the first liquid crystal molecule and the orthographic projection of the long axis of the second liquid crystal molecule.

In some embodiments, the method further comprises providing a first compensation film at a side of the first substrate away from the liquid crystal layer.

In some embodiments, the method further comprises providing a second compensation film at a side of the second substrate away from the liquid crystal layer.

BRIEF DESCRIPTION OF THE DRAWINGS

Examples of the present disclosure are described in detail with reference to the accompanying drawings, in which.

It should be understood that the drawings are only schematic and are not necessarily to scale. The same reference numerals refer to the same or similar elements throughout all drawings.

DETAILED DESCRIPTION OF THE EMBODIMENTS

Figure 1A:
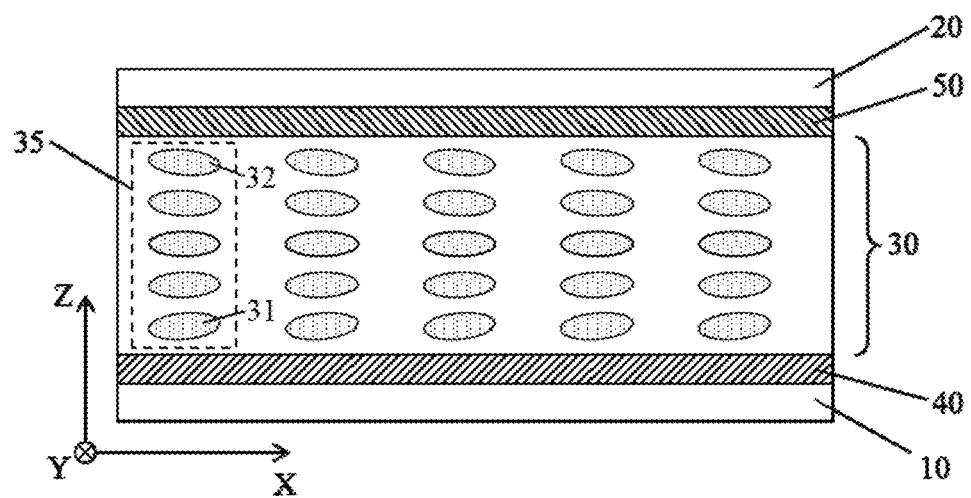
FIG. 1A schematically illustrates a cross-sectional view of a display panel according to an embodiment of the present disclosure.

Embodiments of the present disclosure are described in detail below. The embodiments described below are exemplary and are only used to explain the present disclosure, and should not be construed as limiting the present disclosure.

Advanced Super Dimension Switching (ADSDS, ADS for short) mode liquid crystal display panel is currently a promising display panel. In the ADS mode liquid crystal display panel, the electric field generated by the edges of the slit pixel electrodes in the same plane and the electric field generated between the layer of the slit pixel electrodes and the layer of the planar common electrode form a multi-dimensional electric field. This electric field is a horizontal electric field. The horizontal electric field enables the rotation of the liquid crystal molecules of all orientation, which are located between the slit electrodes or directly above the electrodes in the liquid crystal cell, thereby improving the working efficiency of the liquid crystal and increasing the light transmission efficiency and display viewing angle. The ADS technology can improve the picture quality of TFT-LCD, and has the advantages of high resolution, high transmittance, low power consumption, wide viewing angle, high aperture ratio, low chromatic aberration, and no push Mura, etc.

During the manufacturing process of the liquid crystal display panel, the liquid crystal layer cannot avoid a certain pretilt angle beside the surface of the alignment layers during the rubbing alignment process, that is, the pretilt angle of the liquid crystal layer cannot be 0°. Therefore, the axial directions of the liquid crystal seen from the left and right viewing angles are inconsistent. In turn, the differences in refractive indexes Δn of various directions of the liquid crystal in the left viewing angles is different from that in the right viewing angles. Since the thicknesses d of the liquid crystal layer seen from the left and right viewing angles are the same, the phase retardations $R_o=\Delta n*d$ of the left and right viewing angles are not equal, and the resulting optical path differences are not equal. The wavelengths of the light transmitted through the liquid crystal layer are not equal and the color shift occurs, especially in the dark state mode, which affects the display effect of the liquid crystal display panel. The term "dark state mode" refers to a situation where a pixel displays a darker color (for example, black). Therefore, the difference in the retardations needs to be compensated to eliminate the difference, such that the effective retardations become consistent, thereby improving the color shift phenomenon.

In a conventional ADS liquid crystal display panel, the direction of the slit pixel electrode is the same as the direction of the long side of the pixel. This arrangement is called the lateral slit electrode. In order to solve the problem of color shift, an improvement solution is to change the slit pixel electrode from lateral to vertical. However, this solution will seriously affect the aperture ratio of the display panel. Therefore, it is desirable to propose a display panel that can effectively compensate the phase retardation of the emitted light, effectively improve the phenomenon of color shift, and does not affect the aperture ratio of the display panel, so that the display panel has a larger effective viewing angle and a higher display quality.

Figure 1B:
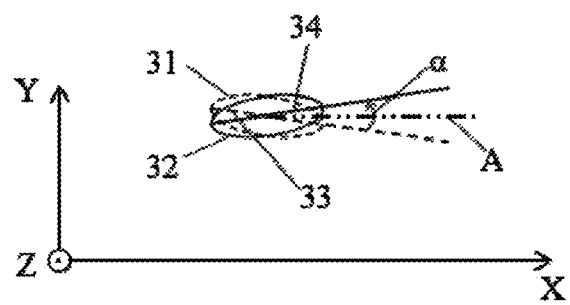
FIG. 1B schematically illustrates a top view of a part of the liquid crystals in a display panel according to an embodiment of the present disclosure.
Figure 1C:
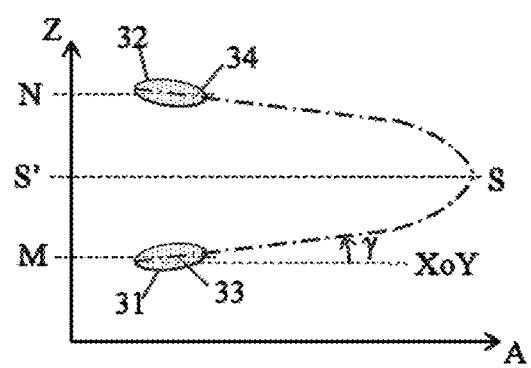
FIG. 1C schematically illustrates a side view of a part of the liquid crystals in a display panel according to an embodiment of the present disclosure.

According to an aspect of the present disclosure, there is provided a display panel. FIG. 1A schematically illustrates a cross-sectional view of a display panel according to an embodiment of the present disclosure. The display panel comprises a first substrate 10, a first alignment film 40, a liquid crystal layer 30, a second alignment film 50 and a second substrate 20, which extend along the first direction and the second direction and are arranged sequentially along a third direction perpendicular to the first direction and the second direction. In order to identify the orientations more clearly, FIG. 1A shows an X-axis indicating the extending direction of the long side of the display panel, a Y-axis indicating the extending direction of the short side of the display panel, and a Z-axis indicating the thickness direction of the display panel. In an example, the directions of the X-axis, Y-axis, and Z-axis in FIG. 1A may be the aforementioned first direction, second direction, and third direction, respectively. However, the first direction, the second direction, and the third direction are not necessarily the directions of the X-axis, Y-axis, and Z-axis in FIG. 1A. In addition, the angle between the first direction and the second direction can be a right angle (for example, as shown by the X-axis and the Y-axis), but this is not necessary either. In the display panel, the first substrate 10 and the second substrate 20 are disposed in parallel and facing each other. The liquid crystal layer 30 is disposed between the first substrate 10 and the second substrate 20. The first alignment film 40 is disposed on a surface of the first substrate 10 closer to the liquid crystal layer 30. The second alignment film 50 is disposed on a surface of the second substrate 20 closer to the liquid crystal layer 30. The liquid crystal layer 30 comprises a column of liquid crystal molecules 35 arranged in the third direction (for example, the Z direction). This column of liquid crystal molecule 35 comprises a first liquid crystal molecule 31 that is closest to the first alignment film 40 and a second liquid crystal molecule 32 that is closest to the second alignment film 50. The directions of the liquid crystal molecules between the first liquid crystal molecule 31 and the second liquid crystal molecule 32 gradually change from the direction of the first liquid crystal molecule 31 to the direction of the second liquid crystal molecule 32. FIG. 1B schematically illustrates a partial cross-sectional view of the display panel of FIG. 1A along a plane defined by the first direction and the second direction. For clarity, FIG. 1B shows only the first liquid crystal molecule 31 and the second liquid crystal molecule 32. On the plane defined by the first direction and the second direction (such as the XoY plane of FIG. 1B), the orthographic projection of the long axis of the first liquid crystal molecule 31 and the orthographic projection of the long axis of the second liquid crystal molecule 32 form an acute angle. This acute angle is the twist angle of the liquid crystal layer. In the following, for clarity, the term "acute angle" is sometimes replaced with the term "twist angle" in the description. Moreover, on a plane defined by the angular bisector A of the acute angle and the third direction, the extension line of the orthographic projection of the long axis of the first liquid crystal molecule 31 intersects with the extension line of the orthographic projection of the long axis of the second liquid crystal molecule 32 to form the intersection point S. In addition, on the line where the third direction is located, the orthographic projection of the intersection point S is between the orthographic projection of the long axis of the first liquid crystal molecule 31 and the orthographic projection of the long axis of the second liquid crystal molecule 32. FIG. 1C schematically illustrates a partial cross-sectional view of the display panel of FIG. 1A along a plane defined by the third direction and the angular bisector of the twist angle. Specifically, for the sake of simplicity, FIG. 1C only shows the first liquid crystal molecule 31 and the second liquid crystal molecule 32. Considering the limitation of the size of the submitted application document, FIG. 1C only schematically depicts the fact that the extension line of the orthographic projection of the long axis of the first liquid crystal molecule 31 intersects with the extension line of the orthographic projection of the long axis of the second liquid crystal molecule 32 and the location of the intersection point S. As shown in FIG. 1C, the orthographic projection S' of the intersection point S on the third direction is located between the orthographic projection M of the long axis of the first liquid crystal molecule 31 on the third direction and the orthographic projection N of the long axis of the second liquid crystal molecule 32 on the third direction. It should be noted that, what is shown by FIG. 1C is the orthographic projections of the long axis of the first liquid crystal molecule 31 and the long axis of the second liquid crystal molecule 32, rather than the two long axes themselves. The long axis of the first liquid crystal molecule 31 and the line where the third direction is located spatially belong to different planes, so do the long axis of the second liquid crystal molecule 32 and the line where the third direction is located. Therefore, the orthographic projection of the long axis of the first liquid crystal molecule 31 on the line where the third direction is located is a point (i.e., the point M), and the orthographic projection of the long axis of the second liquid crystal molecule 32 on the line where the third direction is located is also a point (i.e., the point N). The extension lines of the orthographic projections of the long axis of the first liquid crystal molecule 31 on the AoZ plane intersects with the extension lines of the orthographic projections of the long axis of the second liquid crystal molecule 32 on the AoZ plane to form the intersection point S, and the point S', which is the orthographic projection of the intersection point S on the line where the third direction is located, is between the point M and the point N. This phenomenon can also be briefly described below as: on the plane defined by the angular bisector of the twist angle and the third direction, the tilting tendency of the long axis of the first liquid crystal molecule 31 and the tilting tendency of the long axis of the second liquid crystal molecule 32 are different.

In the present disclosure, the second liquid crystal molecule 32 which is close to the second alignment film 50 and the first liquid crystal molecule 31 which is close to the first alignment film 40 have opposite tilting tendencies with respect to the plane where the first substrate is located, and the liquid crystal layer 30 has a twist angle. Based on the above arrangement, the self-compensation effect can be achieved, and the color shift phenomenon can be effectively improved, especially the color shift phenomenon in the dark state mode.

The first alignment film and the second alignment film of the display panel according to the present disclosure are formed by using the method of rubbing in the same direction. As shown in FIG. 1C, the resulting first alignment film and second alignment film enable the first liquid crystal molecule 31, which is close to the first alignment film, and the second liquid crystal molecule 32, which is close to the second alignment film, to have different tilting tendencies with respect to the plane where the first substrate 10 and the second substrate 20 are located (such as the XoY plane). Specifically, for example, in the perspective of FIG. 1C, the long axis 33 of the first liquid crystal molecule 31 is rotated clockwise with respect to the first direction X, and the long axis 34 of the second liquid crystal molecule 32 is rotated counterclockwise with respect to the first direction X.

It should be noted, that after forming the alignment films by rubbing and assembling the two substrates (at this moment, the liquid crystal layer is in the initial state where no electrical field is applied), the liquid crystal molecules in the liquid crystal layer that are close to the substrates are aligned according to the rubbing direction of the alignment film. In the display panel according to the present disclosure, an angle is maintained between the long axis of the liquid crystal molecule and the surface of the first substrate. The acute angle γ between the long axis of the first liquid crystal molecule 31 and the plane where the first substrate is located (i.e., the XoY plane) is called the pretilt angle of the liquid crystal layer. Specifically, referring to FIG. 1C (in which, in order to show the pretilt angle of the liquid crystal layer more clearly, the first liquid crystal molecule 31 and the second liquid crystal molecule 32 are enlarged), the dashed line XoY represents a plane parallel to the first substrate, the acute angle γ between the XoY plane and the long axis 33 of the first liquid crystal molecule 31 is the pretilt angle. It should be noted that the degree of the pretilt angle is characterized with a positive or negative sign. In the present disclosure, when determining the sign of the pretilt angle, the edge of the acute angle γ which is located on the plane where the first substrate is located is identified as the starting edge, and the long axis of the first liquid crystal molecule 31 is identified as the ending edge. If the pretilt angle is obtained by rotating counterclockwise from the starting edge to the ending edge, the sign of the degree of the pretilt angle is positive. For example, in FIG. 1C, the angle between the long axis of the first liquid crystal molecule 31 and the plane where the first substrate is located is positive, and the angle between the long axis of the second liquid crystal molecule 32 and the plane where the first substrate is located is negative.

In addition, the degree of the twist angle of liquid crystal molecule is also characterized with a positive or negative sign. As shown in FIG. 1B, the projection of the long axis 33 of the first liquid crystal molecule 31 on the plane where the first substrate is located is identified as the starting edge of the twist angle, and the projection the long axis 34 of the second liquid crystal molecule 32 on the plane where the first substrate is located is identified as the ending edge of the twist angle. When overlooking the display panel along the −Z direction, if the acute twist angle is obtained by rotating from the starting edge to the ending edge in a counterclockwise direction, the sign of the twist angle α is positive. For example, FIG. 1B shows the rotation direction of the twist angle whose sign is positive. When overlooking the display panel along the −Z direction, if the acute twist angle is obtained by rotating from the starting edge to the ending edge in a clockwise direction, the sign of the twist angle α is negative.

In addition, it should be noted that the display panel is usually placed above the horizon of the human eye. In other words, when viewing a display panel, the users usually look at it from a position below the display panel. Therefore, it is especially critical to improve the lower viewing angle of the display panel. The display panel of the present disclosure can well compensate the difference in the phase retardations of the emitted light, thereby improving the color shift phenomenon, increasing the effective viewing range, and improving the display quality. The display panel of the present disclosure can particularly improve the color shift phenomenon of the lower viewing angle of the display panel.

The specific types of the first substrate and the second substrate of the display panel of the embodiments of the present disclosure are not limited. Those skilled in the art can flexibly choose them according to the specific type of the display panel. In the embodiments of the present disclosure, the first substrate may be an array substrate, and the second substrate may be a color filter substrate. Those skilled in the art can understand that, the first substrate may be provided with a light-shielding layer (for preventing the light from being irradiated to the active layer), thin film transistors (which may be bottom-gate mode thin film transistors (for example, back-channel etched TFTs), top-gate mode thin film transistors, low-temperature polysilicon thin film transistors or other suitable thin film transistors), pixel electrodes, pixel capacitor structures, and other structures. The second substrate may be provided with structures such as a black matrix, a color filter, and a protective layer, etc.

There are no restrictions on the materials of the first alignment film and the second alignment film. Those skilled in the art can flexibly choose them according to actual needs. In some embodiments, the materials of the first alignment film and the second alignment film may comprise polyimide (PI), which has good chemical stabilities, excellent mechanical properties, good insulation properties, and good resistance to high temperature and radiation.

The material of the liquid crystal molecule is also not limited. Those skilled in the art can flexibly choose it according to actual needs, as long as the liquid crystal has high stability, suitable birefringence, low viscosity, relatively large dielectric anisotropy, high resistance, high voltage retention, wide temperature range, and good alignment properties, etc.

Therefore, in some embodiments, in order to make the color shift as small as possible, the sum of the degrees of the pretilt angle and the twist angle is equal to zero. By doing so, the color shift phenomenon of the display panel can be improved to the greatest extent.

In order to maintain a larger light transmittance, in some embodiments, the absolute value of the degree of the pretilt angle is less than or equal to 2°. More specifically, the pretilt angle may be 1°. By doing so, it is possible to reduce the adverse influence on the light transmittance while still compensating the difference in the phase retardations of the emitted light.

In addition, in order to maintain a large light transmittance, the absolute value of the degree of the twist angle is less than or equal to 1.2°. For example, in some embodiments, the twist angle may be −1°. By doing so, it is possible to ensure that the display panel has a good light transmittance while the color shift is stilled improved.

Figure 2:
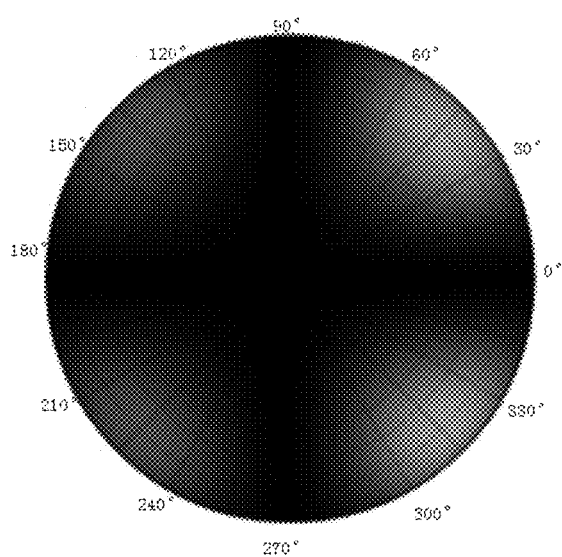
FIG. 2 schematically illustrates a chromatic aberration simulation diagram of a display panel in the related art.

FIG. 2 shows the color shifts of various viewing angles of a conventional display panel which is characterized by the Lab color model. The color shift can be characterized by the following equation:

$$\Delta E_{ab}^* = \sqrt{(L_2^* - L_1^*)^2 + (a_2^* - a_1^*)^2 + (b_2^* - b_1^*)^2}$$

wherein, L, a and b are three parameters in the Lab color model. Parameter L stands for brightness (i.e., black/white), $L_1^*$ stands for the sample brightness, $L_2^*$ stands for the standard brightness, $\Delta L = L_2^* - L_1$, $\Delta L$ stands for the black-white deviation. A positive $\Delta L$ indicates that the sample is whiter than the standard, and a negative $\Delta L$ indicates that the sample is blacker than the standard. Parameter a represents the color of red/green, $a_1^*$ represents the red-green chromatic value of the sample, $a_2^*$ represents the red-green chromatic value of the standard, $\Delta a = a_2^* - a_1^*$, and $\Delta a$ represents the red-green deviation. A positive $\Delta a$ indicates that the sample is redder than the standard, and a negative $\Delta a$ indicates that the sample is greener than the standard. Parameter b represents the color of blue/yellow, $b_1^*$ represents the yellow-blue chromatic value of the sample, $b_2^*$ represents the yellow-blue chromatic value of the standard, $\Delta b = b_{2*} - b_1^*$, and $\Delta b$ represents the yellow-blue deviation. A positive $\Delta b$ indicates that the sample is yellower than the standard, and a negative $\Delta b$ indicates that the sample is bluer than the standard. The chromatic aberrations at different viewing angles are evaluated with reference to the scalar parameter at the fronting viewing angle (0, 0). In this way, the chromatic aberrations under different viewing angles can be compared. The larger the chromatic aberration, the more serious the color shift phenomenon is. As shown in FIG. 2, the colors observed in the lower left viewing angle and lower right viewing angle are significantly different, and the colors observed in the upper left viewing angle and upper right viewing angle are also significantly different. That is to say, both of the lower and upper viewing angles of the display panel have chromatic aberration. According to the above equation, by means of the simulation software techwiz 2D, the chromatic aberration values of the lower viewing angles and the upper viewing angles of the display panel are both 16 chromatic aberration units.

Figure 3:
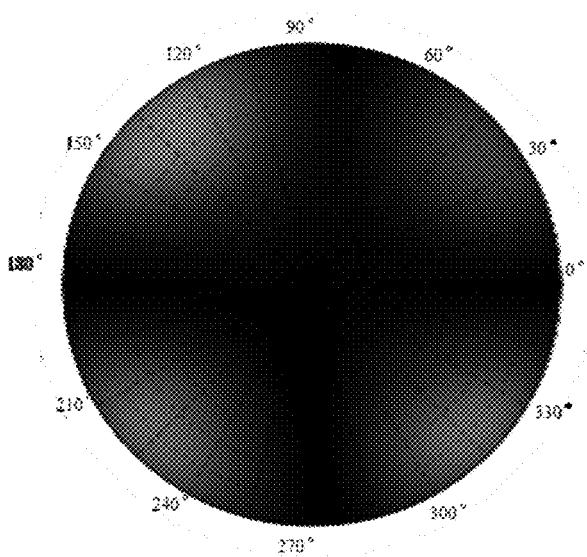
FIG. 3 schematically illustrates a chromatic aberration simulation diagram of a display panel according to an embodiment of the present disclosure.

FIG. 3 illustrates the color shifts of various viewing angles of a display panel according to an embodiment of the present disclosure, which are characterized by using the Lab color model. In this display panel, the pretilt angle is 1°, and the twist angle is −1°. As shown in FIG. 3, the colors observed from the lower left and lower right viewing angles of the display panel are basically the same, that is, the chromatic aberration of the lower viewing angle is very small (about 0 chromatic aberration unit). In this way, it can be seen that, the display panel according to the present disclosure can effectively improve the color shift phenomenon, and is particularly suitable for improving a display panel with a fixed display direction.

The following briefly describes the cooperation of the pretilt angle and the twist angle for reducing the color shift. After the simulation calculation performed according to the above equation, if only considering the influence of the pretilt angle A, a linear relationship exists between the pretilt angle and the chromatic aberration, $\Delta E = k_1 * A$. If only considering the influence of the twist angle B, another linear relationship exists between the twist angle and the chromatic aberration, $\Delta E = k_2 * B$. Then, by substituting the special points (for example, (0, 0), (1, −1) and (2, −2), it can be deduced that $k_1 = k_2 = k$ (wherein k, $k_1$ and $k_2$ represent constants). Considering the influence of the two factors—the pretilt angle and twist angle on the chromatic aberration, it can be obtained that $\Delta E = k(A+B)/2$. It can be seen that, when $A+B=0$, the chromatic aberration is zero. This further validates the foregoing opinions that, in order to minimize the color shift, the sum of the degree of the pre-tilt angle and the twist angle of the liquid crystal could be adjusted to be equal to zero.

Figure 4:
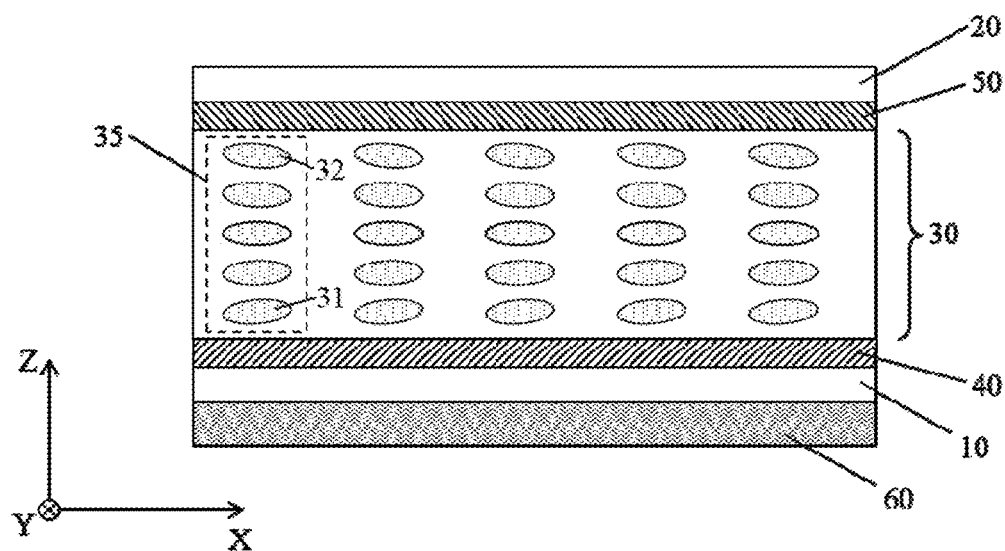
FIG. 4 schematically illustrates a cross-sectional view of a display panel according to another embodiment of the present disclosure.
Figure 5:
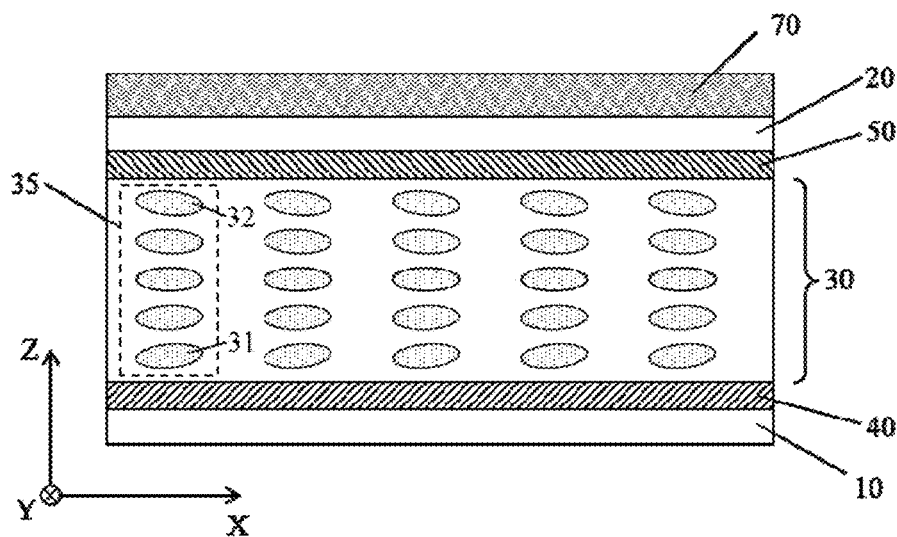
FIG. 5 schematically illustrates a cross-sectional view of a display panel according to yet another embodiment of the present disclosure.
Figure 6:
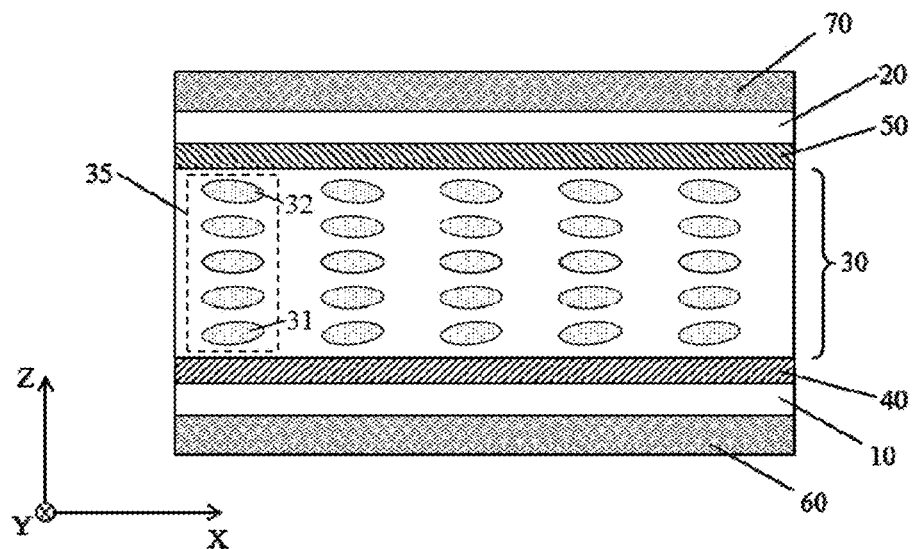
FIG. 6 schematically illustrates a cross-sectional view of a display panel according to still another embodiment of the present disclosure.

In some embodiments, in order to further improve the color shift phenomenon of the display panel, referring to FIG. 4 to FIG. 6, the display panel further comprises at least one of a first compensation film 60 located on the side of the first substrate 10 away from the liquid crystal layer 30 and a second compensation film 70 located on a side of the second substrate 20 away from the liquid crystal layer 30. The compensation film is used to compensate the difference between the effective phase retardations caused by the pretilt angle of the liquid crystal. Specifically, as shown in FIG. 4, by setting the first compensation film 60 on the side of the first substrate 10 away from the liquid crystal layer 30, the difference of the phase retardations of the emitted light caused by the pretilt angle of the lower part of the liquid crystal layer 30. As shown in FIG. 5, by disposing the second compensation film 70 on the side of the second substrate 20 away from the liquid crystal layer 30, it is possible to further compensate for the difference of the phase retardations caused by the pretilt angle of the upper part of the liquid crystal layer 30. As shown in FIG. 6, by disposing the first compensation film 60 on the side of the first substrate 10 away from the liquid crystal layer 30 and the second compensation film 70 on the side of the second substrate 20 away from the liquid crystal layer 30, it is possible to simultaneously improve the color shift phenomenon caused by the upper part and the lower part of the liquid crystal layer. Therefore, a person having ordinary skill in the art can flexibly selects the number and position of the compensation films according to different usage requirements of the display panel.

In some embodiments, the first compensation film is a +A uniaxial compensation film or a −A uniaxial compensation film. The second compensation film is a +A uniaxial compensation film or a −A uniaxial compensation film. The +A uniaxial compensation film means a compensation film having positive phase retardation. The −A uniaxial compensation film means a compensation film having negative phase retardation. By doing so, a better compensation effect can be achieved.

Figure 7A:
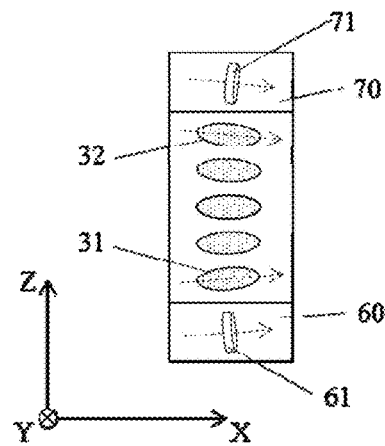
FIG. 7A schematically illustrates a part of the liquid crystals and a part of the compensation film according to an embodiment of the present disclosure.

In some embodiments, the first compensation film and the second compensation film are both −A uniaxial compensation films. FIG. 7A schematically illustrates a cross-sectional view of a display panel in which the first compensation film 60 and the second compensation film 70 are both −A uniaxial compensation films. The refractive index of the x-axis of the liquid crystal of the −A uniaxial compensation film is smaller than the refractive indexes of the y-axis and the z-axis, and the refractive index of the y-axis is equal to the refractive index of the z-axis (i.e., $n_x < n_y = n_z$). The arrow in the compensation film indicates the orientation of the x-axis of the liquid crystal in the −A uniaxial compensation film. It should be noted that, the degree of the angle between the x-axis of the liquid crystal in the compensation film and the first plane is characterized by a positive or negative sign. The angle starts with the edge on the plane where the first substrate is located and ends with the x-axis of the liquid crystal. According to the perspective of FIG. 7A, if the acute angle formed between the x-axis and the plane where the first substrate is located is obtained by rotating counterclockwise from the starting edge to the ending edge, the sign of the angle is positive. If the acute angle formed between the x-axis and the planes where the first substrate is located is obtained by rotating clockwise from the starting edge to the ending edge, the sign of the angle is negative. For example, in FIG. 7A, the angle of the liquid crystal molecule 61 in the first compensation film 60 is positive, and the angle of the liquid crystal molecule 71 in the second compensation film 70 is negative.

Figure 7B:
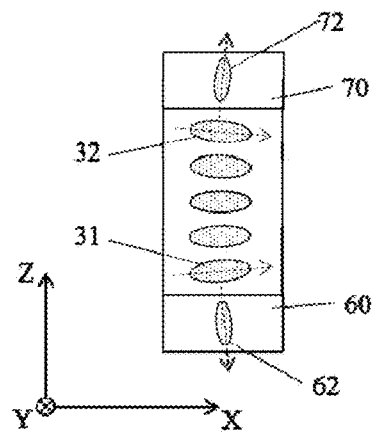
FIG. 7B schematically illustrates a part of the liquid crystals and a part of the compensation film according to another embodiment of the present disclosure.

In some embodiments, the first compensation film and the second compensation film are both +A uniaxial compensation film. FIG. 7B schematically illustrates a cross-sectional view of a display panel in which the first compensation film and the second compensation film are both +A uniaxial compensation films. The refractive indexes of the x-axes of the liquid crystal molecules 62 and 72 of the +A uniaxial compensation films are larger than that of the y-axes and z-axes, and the refractive indexes of the y-axes and the refractive indexes of the z-axes are equal (i.e., $n_x>n_y=n_z$). The arrow in the compensation film indicates the direction of the x-axis of the liquid crystal of the +A uniaxial compensation film, and the sign of the angle formed between the x-axis of the liquid crystal and the plane where the first substrate is located is similar to the situation of the −A uniaxial compensation film. It should be noted that, in order to be more clear, FIGS. 7A and 7B only schematically show the structures of the first compensation film 60, the second compensation film 70, and the liquid crystal layer 30, and omit the structures such as the first alignment film, the second alignment film, the first substrate and the second substrate, etc.

In some embodiments, the first compensation film and the second compensation film are both +A uniaxial compensation films (having positive phase retardations). The orientations of the x-axes of the liquid crystal molecules of the first compensation film and the second compensation film are respectively perpendicular to the directions of the long axes of the liquid crystal molecules in the liquid crystal layer 30 that is close to them respectively. In this way, the first compensation film and the second compensation film can realize a self-compensating viewing angle with the liquid crystal molecules adjacent to them respectively. In some embodiments, the first compensation film and the second compensation film are both −A uniaxial compensation films (having negative phase retardations). The orientations of the x-axes of the liquid crystal molecules of the first compensation film and the second compensation film are respectively the same as the directions of the long axes of the liquid crystal molecules in the liquid crystal layers that are adjacent to them respectively. In this way, the first compensation film and the second compensation film can offset the positive phase retardation of the liquid crystal molecule. In some embodiments, the first compensation film and the second compensation film have the same amount of retardation for the same wavelength. Therefore, the difference of the effective phase retardations can be well compensated, the color shift of the display panel can be improved, the viewing angle can be widened, and the display quality can be improved.

The compensation film has different in-plane phase retardations for different incident light. Specifically, different wavelengths will cause different refractive index difference $n_x-n_y$ of the liquid crystal molecule. According to the in-plane phase retardation equation $R_o=(n_x-n_y)d$, it can be known that $n_x-n_y$ will affect the in-plane phase retardation $R_o$. The present disclosure describes the optical properties of the compensation film by describing the in-plane phase retardation $R_O$ (also called the in-plane optical path difference compensation value) of the compensation film for the incident light of a typical wavelength of 550 nm. In some embodiments, the first compensation film 60 and the second compensation film 70 are both −A uniaxial compensation films. The range of the in-plane optical path difference compensation value $R_O$ of the first compensation film for the incident light with a wavelength of 550 nm is −75 nm to −65 nm. The range of the in-plane optical path difference compensation value $R_O$ of the second compensation film for the incident light with a wavelength of 550 nm is −75 nm to −65 nm. It can be seen that, the in-plane optical path difference compensation values of the first compensation film and the second compensation film for the incident light of the same wavelength are equal. Since the orientations of the x-axes of the liquid crystal molecules of the first compensation film and the second compensation film are respectively the same as the directions of the long axes of the liquid crystal molecules of the liquid crystal layer 30 adjacent to them, the first compensation film and the second compensation film can offset the positive phase retardation of the liquid crystal molecules in the liquid crystal layer 30 and improve the color shift phenomenon of the display panel.

In some embodiments, the first compensation film 60 and the second compensation film 70 are both +A uniaxial compensation films. The range of the in-plane optical path difference compensation value $R_O$ of the first compensation film 60 for the incident light with a wavelength of 550 nm is 25 nm to 35 nm. The range of the in-plane optical path difference compensation value $R_O$ of the second compensation film 70 for the incident light with a wavelength of 550 nm is 25 nm to 35 nm. It can be seen that, the in-plane optical path difference compensation values of the first compensation film and the second compensation film for the incident light of the same wavelength are equal. Since the x-axes of the first compensation film and the second compensation film are perpendicular respectively to the long axes of the liquid crystal molecules in the liquid crystal layer adjacent to them, the first compensation film and the second compensation film can realize self-compensating viewing angles with the liquid crystal molecules in the liquid crystal layer adjacent to them, which effectively compensates for the difference in liquid crystal retardation and improves the color shift phenomenon of the display panel.

According to some embodiments of the present disclosure, in order to better compensate for the difference in effective liquid crystal retardations, under the condition that it is guaranteed that the liquid crystal layer has a twist angle and the tilting tendencies of the liquid crystal molecules respectively close to the first substrate and the second substrate are different, the pretilt angle of the liquid crystal can be adjusted to 1° and the twist angle can be adjusted to −1°. Therefore, the color shift phenomenon of the display panel can be improved to the greatest extent.

Figure 8A:
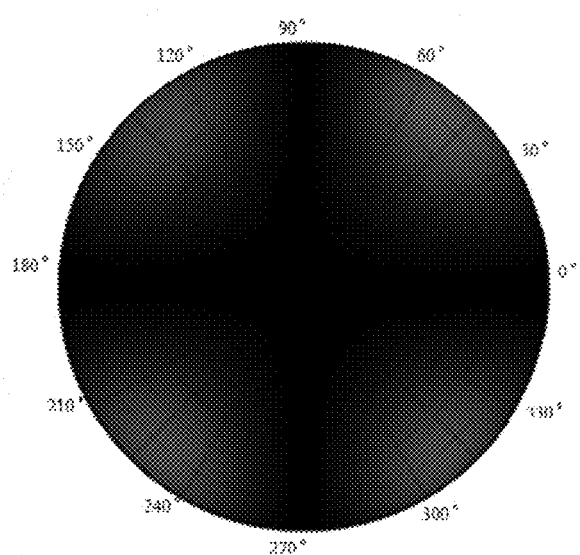
FIG. 8A schematically illustrates a chromatic aberration simulation diagram of a display panel according to another embodiment of the present disclosure.

In some embodiments of the present disclosure, the pretilt angle of the liquid crystal layer is 1°, and the twist angle is −1°. The first compensation film and the second compensation film are both −A uniaxial compensation films. The phase retardation of the first compensation film for a wavelength of 550 nm is −70 nm, and the degree of the inclination of the optical axis of the liquid crystal molecule 61 in the first compensation film with respect to the plane where the first substrate is located is 10. The phase retardation of the second compensation film for a wavelength of 550 nm is also −70 nm, and the degree of the inclination of the optical axis of the liquid crystal molecule 71 in the second compensation film with respect to the plane where the first substrate is located is −1° FIG. 8A schematically illustrates a chromatic aberration diagram of a display substrate according to this embodiment, which is obtained from the calculation by a simulation software techwiz 2D. As shown in FIG. 8A, the color shift of the lower viewing angle is improved to 3 chromatic aberration units, and the color shift of the upper viewing angle is improved to 6 chromatic aberration units. The amount of the leaked light is relatively small and the influence on the contrast is also small.

Figure 8B:
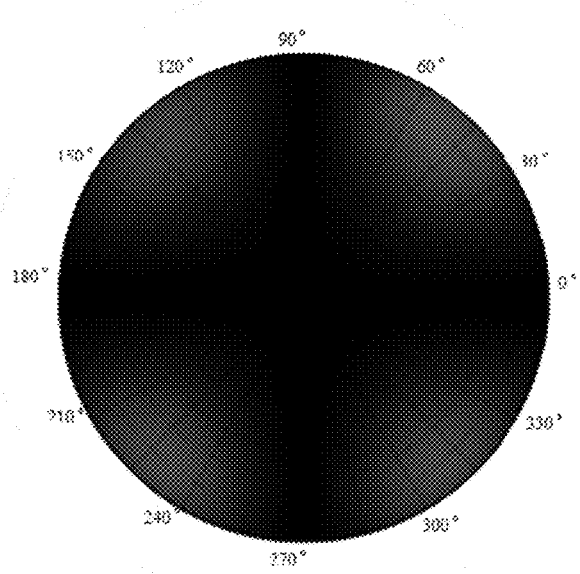
FIG. 8B schematically illustrates a chromatic aberration simulation diagram of a display panel according to yet another embodiment of the present disclosure.

In some embodiments of the present disclosure, the pretilt angle of the liquid crystal layer is 1°, and the twist angle is −1°. The first compensation film and the second compensation film are both +A uniaxial compensation films. The retardation of the first compensation film at a wavelength of 550 nm is 30 nm, and the degree of the inclination of the optical axis of the liquid crystal molecule 62 in the first compensation film with respect to the plane where the first substrate is located is 91°. The retardation of the second compensation film at a wavelength of 550 nm is also 30 nm. The degree of the inclination of the optical axis of the liquid crystal molecule 72 in the second compensation film with respect to the plane where the first substrate is located is 89°. FIG. 8B schematically illustrates a chromatic aberration diagram of a display substrate according to this embodiment, which is obtained from the calculation by a simulation software techwiz 2D. As shown in FIG. 8B, the color shift of the lower viewing angle is improved to 1 chromatic aberration unit, and the color shift of the upper viewing angle is improved to 10 chromatic aberration units. The amount of the leaked light is relatively small and the influence on the contrast is also small.

In some embodiments, the display panel may be an ADS (Advanced Super Dimension Switching) mode liquid crystal display panel. The display panel according to the present disclosure can be applied to display devices such as large-size, high-definition desktop displays and liquid crystal televisions, and can greatly improve the color shift phenomenon of these display devices.

According to some embodiments of the present disclosure, the pixel electrode of the display panel of the present disclosure may adopt a lateral slit electrode. Therefore, not only the color shift phenomenon of the display panel is greatly improved, but also the aperture ratio of the display panel is not affected. The material for forming the lateral slit electrode is not limited, and those skilled in the art can flexibly choose it according to actual needs.

According to another aspect of the present disclosure, there is provided a display device comprising the display panel according to any one of the embodiments of the present disclosure. The specific type of the display device is not limited, and those skilled in the art can flexibly choose according to actual needs. In some embodiments of the present disclosure, the specific type of the display device comprises, but is not limited to, a tablet computer, a notebook, a mobile phone, a game console, a television, and other electronic devices with a display function. Certainly, those skilled in the art can understand that, in addition to the display panel described above, the display device also comprises structures or components necessary for conventional display devices. Taking a mobile phone as an example, in addition to the display panel described above, it also comprises a cover plate, a housing, a camera module, a fingerprint module, CPU processor, a sound processing module and other necessary structures or components.

Figure 9:
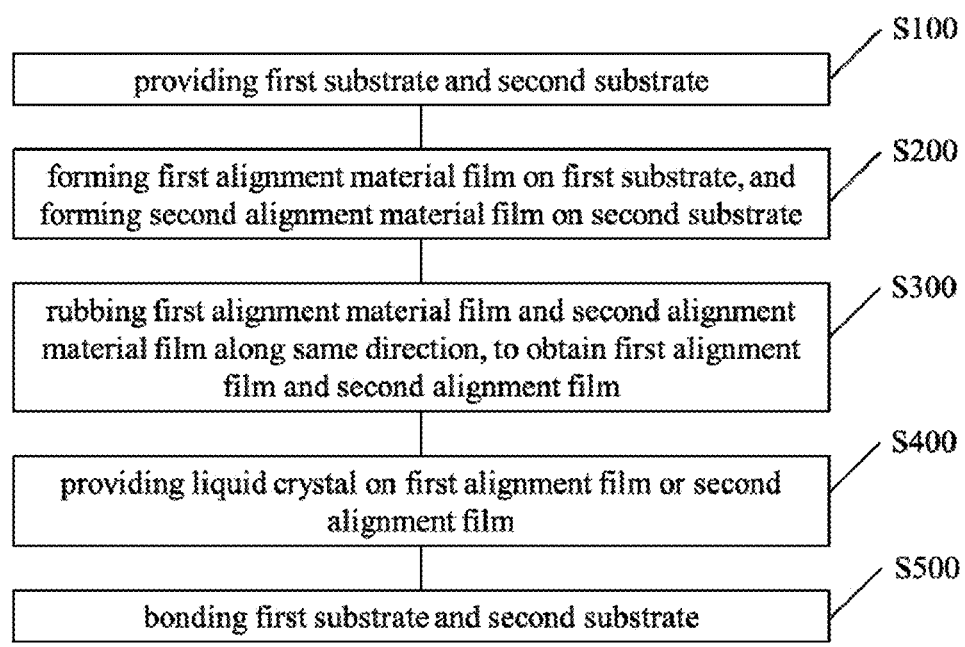
FIG. 9 schematically illustrates a flowchart of a method for manufacturing a display panel according to an embodiment of the present disclosure.

According to yet another aspect of the present disclosure, there is provided a method for manufacturing a display panel. FIG. 9 schematically illustrates a flowchart of a method for manufacturing a display panel according to an embodiment of the present disclosure. The method is described in detail below.

First, a first substrate and a second substrate extending in the first direction and the second direction are provided (Step S100). Then, a first alignment material film is formed on the first substrate, and a second alignment material film is formed on the second substrate (Step S200). After the first alignment material film and the second alignment material film are formed, the first alignment material film and the second alignment material film are rubbed in the same direction (Step S300), so that the first alignment material film and the second alignment material film become the first alignment film 40 and the second alignment film 50, respectively.

According to some embodiments of the present disclosure, the method for forming the first alignment material film and the second alignment material film comprises, but is not limited to, the methods such as APR coating and inkjet printing, which can be summarized as coating alignment liquid on the substrate. After the alignment liquid is coated, curing is performed in order to form the first alignment material film and the second alignment material film. After that, the first alignment material film and the second alignment material film are subjected to rubbing for alignment, to obtain the first alignment film and the second alignment film. This method is simple, its process is mature, and it is easy for industrial production. Since the orientation of the liquid crystal in the liquid crystal layer depends on the alignment film, after the alignment film is formed, the orientation of the liquid crystal after the first substrate and the second substrate are bonded is actually determined. Specifically, the liquid crystal layer after bonding the first substrate and the second substrate comprises a column of liquid crystal molecules arranged in a direction perpendicular to the first substrate. The column of liquid crystal molecules comprises a first liquid crystal molecule closest to the first alignment film and a second liquid crystal molecule closest to the second alignment film. Meanwhile, on the plane where the first substrate is located, the orthographic projection of the long axis of the first liquid crystal molecule intersects with the orthographic projection of the long axis of the second liquid crystal molecule to form an acute angle. That is, the liquid crystal layer has a twist angle which is an acute angle. Further, on a plane defined by the angular bisector of the twist angle and the direction perpendicular to the first substrate, the extension line of the orthographic projection of the long axis of the first liquid crystal molecule intersects with the extension line of the orthographic projection of the long axis of the second liquid crystal molecule to form an intersection point, and on a line where the direction perpendicular to the first substrate is located, the orthographic projection of the intersection point is between the orthographic projections of the long axis of the first liquid crystal molecule and the long axis of the second liquid crystal molecule.

The present disclosure does not limit the specific manner of the step of rubbing the first alignment material film and the second alignment material film in the same direction. Those skilled in the art can flexibly choose according to actual needs. For example, it can be performed by high-speed rubbing by means of flannel materials. This method is simple to operate, has mature process, better treatment effect, and is easy for industrial production.

It should be noted that the expressions such as "rubbing in the same direction" herein refers to that, in the rubbing process for preparing the alignment film, the rubbing directions on the first alignment material film and the second alignment material film are the same. By rubbing in the same direction, after the liquid crystal cell is formed by bonding the first substrate and the second substrate, in the plane defined by the thickness direction of the panel and the direction of the angular bisector of the twist angle, the intersection point of the extension lines of the orthographic projections of the long axes of the liquid crystal molecules respectively close to the first substrate and the second substrate is between the orthographic projections of the long axes of the liquid crystal molecules on the line of the thickness direction of the panel.

The method further comprises the step of providing liquid crystal on the first alignment film 40 or the second alignment film 50 (Step S400). Since the alignment directions of the first alignment film and the second alignment film formed by the same-direction rubbing process are the same, when the plane defined by the third direction and the angular bisector of the twist angle is taken as the reference plane, the initial tilt direction of the long axis of the liquid crystal molecule close to the second alignment film 50 with respect to the plane of the first substrate is opposite to the initial tilt direction of the long axis of the liquid crystal molecule close to the first alignment film 40 with respect to the plane of the first substrate, and the liquid crystal molecules respectively close to the second alignment film 50 and the first alignment film 40 have a twist angle, in order to compensate for the difference in effective liquid crystal retardations, so that the color shift phenomenon of the display panel is improved.

In some embodiments, the liquid crystal may be provided by a dropping method. The specific requirements such as the amount of liquid crystal to be dropped, the position to be dropped, the defoaming conditions, and the time interval from the dropping to the vacuum bonding are not limited in this disclosure. Those skilled in the art can flexibly choose according to the actual process conditions. They are not restricted here.

In addition to the method of dropping liquid crystals, other methods can be used to provide liquid crystals, such as liquid crystal injection. The specific manner may be any one of an immersion method, an impregnation method, a surface tension method, a dipping method and is not restricted in this application.

Then, the first substrate 10 and the second substrate 20 are bonded (Step S500), so that the first substrate, the first alignment film, a liquid crystal layer formed by the liquid crystal, the second alignment film and the second substrate are arranged sequentially in the third direction perpendicular to the first direction and the second direction. The cross-sectional view of the obtained display substrate can be referred to FIG. 1A. The expressions such as "bonding the substrates" means the process that the first substrate and the second substrate are assembled face to face to form a liquid crystal cell. This process can usually use a vacuum bonding method. Those skilled in the art can set the relevant parameters of the vacuum bonding process, such as the vacuum degree of the bonding (usually below 1 Pa), the vacuum exhaust speed, the bonding correction value, according to the actual process requirements, which are not limited here.

In some embodiments, the method for manufacturing a display panel further comprises the step of forming a first compensation film 60 on a side of the first substrate 10 away from the liquid crystal layer 30. In some embodiments, the method for manufacturing a display panel further comprises the step of forming a second compensation film 70 on a side of the second substrate 20 away from the liquid crystal layer 30. In some embodiments, the method for manufacturing a display panel further comprises the step of forming the first compensation film 60 on a side of the first substrate 10 away from the liquid crystal layer 30, and the second compensation film 70 on the side of the second substrate 20 away from the liquid crystal layer 30. A person skilled in the art can flexibly set the quantity and position of the compensation films according to different use requirements of the display panel, so as to improve the color shift of the lower viewing angle and/or the upper viewing angle of the display panel.

It should be noted that the first compensation film 60 and the second compensation film 70 may be a single-layer structure provided separately, or may be part of the polarizer. Specifically, the subsequently formed upper polarizer and lower polarizer may comprise a multilayer structure, and the first compensation film may be one of the layers of the upper polarizer, and the second compensation film may be one of the layers of the lower polarizer. There are no restrictions on the multilayer structure and specific setting of the polarizers, which will not be described here.

The method for manufacturing a display panel according to the embodiments of the present disclosure is simple to operate, and is easy for industrial production. In addition, by the same-direction rubbing process, the liquid crystal molecule closest to the first alignment film and the liquid crystal molecule closest to the second alignment film form a twist angle. Taking the plane defined by the direction of the angular bisector of the twist angle and the direction perpendicular to the first substrate as a reference, the initial tilt direction of the long axis of the liquid crystal molecule closest to the first alignment film with respect to the plane of the first substrate is different from the initial tilt direction of the long axis of the liquid crystal molecule closest to the second alignment film with respect to the plane of the first substrate, so that the difference of the effective phase retardations can be well compensated. In turn, the color shift phenomenon can be improved, the viewing angle can be widened, and the display quality can be improved. Moreover, since the display substrate still uses the lateral slit electrodes, the aperture ratio of the display panel is not influenced.

According to some embodiments of the present disclosure, the above manufacturing method may be used to manufacture the display panel described above, wherein the various requirements for the first substrate, the second substrate, the first alignment film, the second alignment film, the first compensation film, and the second compensation film are the same as those described above, and will not be repeated here.

In summary, the present disclosure provides a display panel, a display device, and a method for manufacturing a display panel. The display panel comprises a first substrate, a first alignment film, a liquid crystal layer, a second alignment film and a second substrate extending along a first direction and a second direction and sequentially arranged along a third direction perpendicular to the first direction and the second direction. The liquid crystal layer comprises a column of liquid crystal molecules arranged along the third direction, and the column of liquid crystal molecules comprises a first liquid crystal molecule closest to the first alignment film and a second liquid crystal molecule closest to the second alignment film. On a plane defined by the first direction and the second direction, an orthographic projection of a long axis of the first liquid crystal molecule is arranged at an acute angle to an orthographic projection of a long axis of the second liquid crystal molecule. On a plane defined by an angular bisector of the acute angle and the third direction, an extension line of the orthographic projection of the long axis of the first liquid crystal molecule intersects with an extension line of the orthographic projection of the long axis of the second liquid crystal molecule to form an intersection point. On a line where the third direction is located, an orthographic projection of the intersection point is between the orthographic projection of the long axis of the first liquid crystal molecule and the orthographic projection of the long axis of the second liquid crystal molecule.

It should be understood that the terms such as "first", "second", "third" and "fourth" etc. are used for naming purposes only, and cannot be understood as indicating or implying relative importance or implicitly indicating the number of the referred technical feature. Therefore, the features defined with "first", "second", "third" and "fourth"

etc. may explicitly or implicitly comprise one or more of the features. In the description of the present disclosure, the meaning of the terms such as "a plurality of" and "multiple" is two or more, unless specifically defined otherwise.

In the description of this specification, the expressions with reference to the terms such as "an embodiment", "some embodiments", "an example", "specific examples" or "some examples" and the like means that the specific features, structure, material, or characteristic of these embodiments or examples is comprised in at least one embodiment or example of the present disclosure. In this specification, the exemplary expressions of the above terms are not necessarily directed to the same embodiment or example. Moreover, the described specific features, structures, materials or characteristics may be combined in any suitable manner in one or more embodiments or examples. In addition, those skilled in the art may combine different embodiments or examples or combine features of the different embodiments or examples described in this specification, if there is no conflict between the technical solutions.

As will be apparent to those skilled in the art, many different ways of performing the methods of the embodiments of the present disclosure are possible. For example, the order of the steps can be changed, or some steps can be performed in parallel. In addition, other method steps can be inserted between steps. The inserted steps may represent improvements to a method described herein, or may be independent of the method. Also, a given step may not be fully completed before the next step begins.

Although the embodiments of the present disclosure have been shown and described above, it can be understood that the above embodiments are exemplary and should not be construed as limitations on the present disclosure. Those skilled in the art can make changes, modifications, replacements, and variations to the above-mentioned embodiments within the scope of the present disclosure.

We claim:

1. A display panel, comprising:
    a first substrate, a first alignment film, a liquid crystal layer, a second alignment film and a second substrate extending along a first direction and a second direction and sequentially arranged along a third direction perpendicular to the first direction and the second direction,
    wherein the liquid crystal layer comprises a column of liquid crystal molecules along the third direction, and the column of liquid crystal molecules comprises a first liquid crystal molecule closest to the first alignment film and a second liquid crystal molecule closest to the second alignment film,
    wherein, on a plane defined by the first direction and the second direction, an orthographic projection of a long axis of the first liquid crystal molecule is at an acute angle to an orthographic projection of a long axis of the second liquid crystal molecule,
    wherein, on a plane defined by an angular bisector of the acute angle and the third direction, an extension line of the orthographic projection of the long axis of the first liquid crystal molecule intersects with an extension line of the orthographic projection of the long axis of the second liquid crystal molecule to form an intersection point, and
    wherein, on a line along the third direction, an orthographic projection of the intersection point is between the orthographic projection of the long axis of the first liquid crystal molecule and the orthographic projection of the long axis of the second liquid crystal molecule.

2. The display panel of claim 1, wherein a sum of following items is 0°:
    a degree of an angle formed by a line along the long axis of the first liquid crystal molecule and the plane defined by the first direction and the second direction, and
    a degree of the acute angle.

3. The display panel of claim 2, wherein an absolute value of the degree of the acute angle is less than or equal to 1.2°.

4. The display panel of claim 2, wherein an absolute value of the degree of the angle formed by the line along the long axis of the first liquid crystal molecule and the plane defined by the first direction and the second direction is less than or equal to 2°.

5. The display panel according to claim 1, further comprising at least one of a first compensation film at a side of the first substrate away from the liquid crystal layer or a second compensation film at a side of the second substrate away from the liquid crystal layer.

6. The display panel of claim 5,
    wherein the first compensation film comprises a +A uniaxial compensation film or a −A uniaxial compensation film, or
    wherein the second compensation film comprises a +A uniaxial compensation film or a −A uniaxial compensation film.

7. The display panel of claim 6,
    wherein the column of liquid crystal molecules comprises a third liquid crystal molecule closest to a liquid crystal molecule of the +A uniaxial compensation film, and
    wherein a direction of a long axis of the liquid crystal molecule of the +A uniaxial compensation film is perpendicular to a direction of a long axis of the third liquid crystal molecule.

8. The display panel of claim 6,
    wherein the column of liquid crystal molecules comprises a fourth liquid crystal molecule closest to a liquid crystal molecule of the −A uniaxial compensation film, and
    wherein a direction of a long axis of the liquid crystal molecule of the −A uniaxial compensation film is a same direction of a long axis of the fourth liquid crystal molecule.

9. The display panel of claim 6, wherein the at least one of a first compensation film at a side of the first substrate away from the liquid crystal layer or a second compensation film at a side of the second substrate away from the liquid crystal layer comprises both of the first compensation film and the second compensation film, and the first compensation film and the second compensation film are both +A uniaxial compensation films, or the first compensation film and the second compensation film are both −A uniaxial compensation films.

10. The display panel of claim 9, wherein the first compensation film and the second compensation film have equal in-plane phase retardations for incident light with a same wavelength.

11. The display panel of claim 9,
    wherein the first compensation film and the second compensation film are both −A uniaxial compensation films, and
    wherein a range of in-plane phase retardations of the first compensation film and the second compensation film for incident light with a wavelength of 550 nm is −65 nm to −70 nm.

12. The display panel of claim 9,
wherein the first compensation film and the second compensation film are both +A uniaxial compensation films, and
wherein a range of in-plane phase retardations of the first compensation film and the second compensation film for incident light with a wavelength of 550 nm is 25 nm to 35 nm.

13. The display panel of claim 1, wherein the display panel comprises an ADS mode liquid crystal display panel.

14. The display panel of claim 13,
wherein the display panel comprises a rectangular pixel, and
wherein an extending direction of a slit pixel electrode of the rectangular pixel is same as an extending direction of a long side of the rectangular pixel.

15. A display device, comprising the display panel according to claim 1.

16. A method for manufacturing a display panel, comprising:
providing a first substrate and a second substrate extending along a first direction and a second direction;
forming a first alignment material film on the first substrate and forming a second alignment material film on the second substrate;
rubbing the first alignment material film and the second alignment material film along a same direction, so that the first alignment material film becomes a first alignment film and the second alignment material film becomes a second alignment film;
providing liquid crystal on the first alignment film or the second alignment film; and
bonding the first substrate and the second substrate, so that the first substrate, the first alignment film, a liquid crystal layer formed by the liquid crystal, the second alignment film and the second substrate are sequentially arranged along a third direction perpendicular to the first direction and the second direction,
wherein, the liquid crystal layer comprises a column of liquid crystal molecules along the third direction, and the column of liquid crystal molecules comprises a first liquid crystal molecule closest to the first alignment film and a second liquid crystal molecule closest to the second alignment film,
wherein, on a plane defined by the first direction and the second direction, an orthographic projection of a long axis of the first liquid crystal molecule is at an acute angle to an orthographic projection of a long axis of the second liquid crystal molecule,
wherein, on a plane defined by an angular bisector of the acute angle and the third direction, an extension line of the orthographic projection of the long axis of the first liquid crystal molecule intersects with an extension line of the orthographic projection of the long axis of the second liquid crystal molecule to form an intersection point, and
wherein, on a line along the third direction, an orthographic projection of the intersection point is between the orthographic projection of the long axis of the first liquid crystal molecule and the orthographic projection of the long axis of the second liquid crystal molecule.

17. The method of claim 16, further comprising:
providing a first compensation film at a side of the first substrate away from the liquid crystal layer.

18. The method of claim 16, further comprising:
providing a second compensation film at a side of the second substrate away from the liquid crystal layer.

* * * * *